United States Patent [19]

Coyle, Jr. et al.

[11] Patent Number: 5,630,124

[45] Date of Patent: May 13, 1997

[54] SYSTEM AND METHOD FOR ASSURING ATOMICITY OF DISTRIBUTED UPDATE REQUESTS IN A PARALLEL DATABASE

[75] Inventors: Daniel J. Coyle, Jr., San Jose, Calif.; Amy Chang, Cortlandt Manor, N.Y.; Timothy R. Malkemus, Round Rock, Tex.; Walter G. Wilson, New Paltz, N.Y.

[73] Assignee: International Business Machines Corporation, Armonk, N.Y.

[21] Appl. No.: 163,100

[22] Filed: Dec. 6, 1993

[51] Int. Cl.[6] .............................. G06F 17/30; G06F 17/40; G06F 19/00
[52] U.S. Cl. .............. 395/614; 395/200.01; 395/200.02; 395/200.03; 395/610; 395/611
[58] Field of Search ....................................... 395/600, 575

[56] References Cited

U.S. PATENT DOCUMENTS 5,140,689  8/1992  Kobayashi .
5,201,044  4/1993  Frey, Jr. et al. ..................... 395/575

OTHER PUBLICATIONS

Richard Koo, Sam Toueg, Checkpointing and Rollback-Recovery for Distributed Systems, Department of Computer Science Cornell University Ithaca, New York 14853, pp. 1150–1158.

*Primary Examiner*—Thomas G. Black
*Assistant Examiner*—Cheryl Lewis
*Attorney, Agent, or Firm*—Jeffrey S. LaBaw; Andrew J. Dillon

[57] ABSTRACT

In parallel database management systems, database update requests typically result in activity at several nodes. Rollback of all updates is required if the update of any node fails. A coordination process monitors for failure or success of updates. The coordinator further provides for distinguishing activities that have taken place at any given node from the other nodes for different database update requests. Savepoints are local. This allows rollback of a selected update without affecting nodes which did not process the update.

17 Claims, 3 Drawing Sheets

SYSTEM AND METHOD FOR ASSURING ATOMICITY OF DISTRIBUTED UPDATE REQUESTS IN A PARALLEL DATABASE

BACKGROUND OF THE INVENTION

1. Technical Field

The invention relates to parallel or homogeneous distributed databases and more particularly to supporting of distributed update requests within a transaction on a parallel database.

2. Background

A distributed database system is one implemented over a communication network linking a plurality of computers. The database itself is partitioned among the individual computers. A database request from an application program running on one computer can be sent to one or more remote computers over the network. To handle such a request a coordinator running on a computer (either the computer where the application program is executing or a remote computer which exclusively handles coordination) decides whether the transaction owning the request is to be committed or rolled back. A true distributed request is permitted to span multiple computers. Its operation is transparent to the user and to the application program. For example, the request may involve the virtual union of partitions on mutually remote computers.

Throughput in a distributed database system should be better than in a nondistributed database system because requests from a transaction can be divided among appropriate remote computers or span partitions where more than one partition is appropriate. The handling of requests in parallel is readily handled as long as no modification of the database is required. A request which involves any modification of the records of the database has forced serialization (i.e. completion) of requests in order to allow for distribution of the request without compromising rollback of the transaction if later required.

A distributed transaction (also called a distributed unit of work) may include several distributed update requests. Requiring serialization of all operations from the requests compromises the principle of executing the transaction in parallel. Throughput then falls below possible levels.

SUMMARY OF THE INVENTION

It is another object of the invention to provide a system and method for supporting distributed update requests within a transaction on a parallel database.

The foregoing objects are achieved as now described. The invention provides a method of managing distributed requests on a parallel database management system. Responsive to initiation of a transaction, a request counter for a coordination process is initialized. Responsive to each receipt of a request for distribution by the coordination process, the request counter for the coordination process will be incremented. Request instances, including savepoint data such as the current request counter, are generated for each request and distributed to selected subordinate processes on different nodes for the partitions of the database. Responsive to receipt of a request instance on a selected subordinate process, a local savepoint with the request savepoint data and locally generated savepoint data is stored for each selected subordinate process. An attempt to execute the request instance is then made. Success or failure of the execution attempt is returned to the coordination process for each request instance. Responsive to indication of failure of execution for any request instance, a rollback is performed on each subordinate process on which the local savepoint indicates execution of a request instance for the request.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a high level logical flow chart for a subordinate process relating to handling of a request; and FIG. 5 is a high level logical flow chart for a subordinate process relating to handling of a rollback.

DETAILED DESCRIPTION OF THE INVENTION

Figure 1:
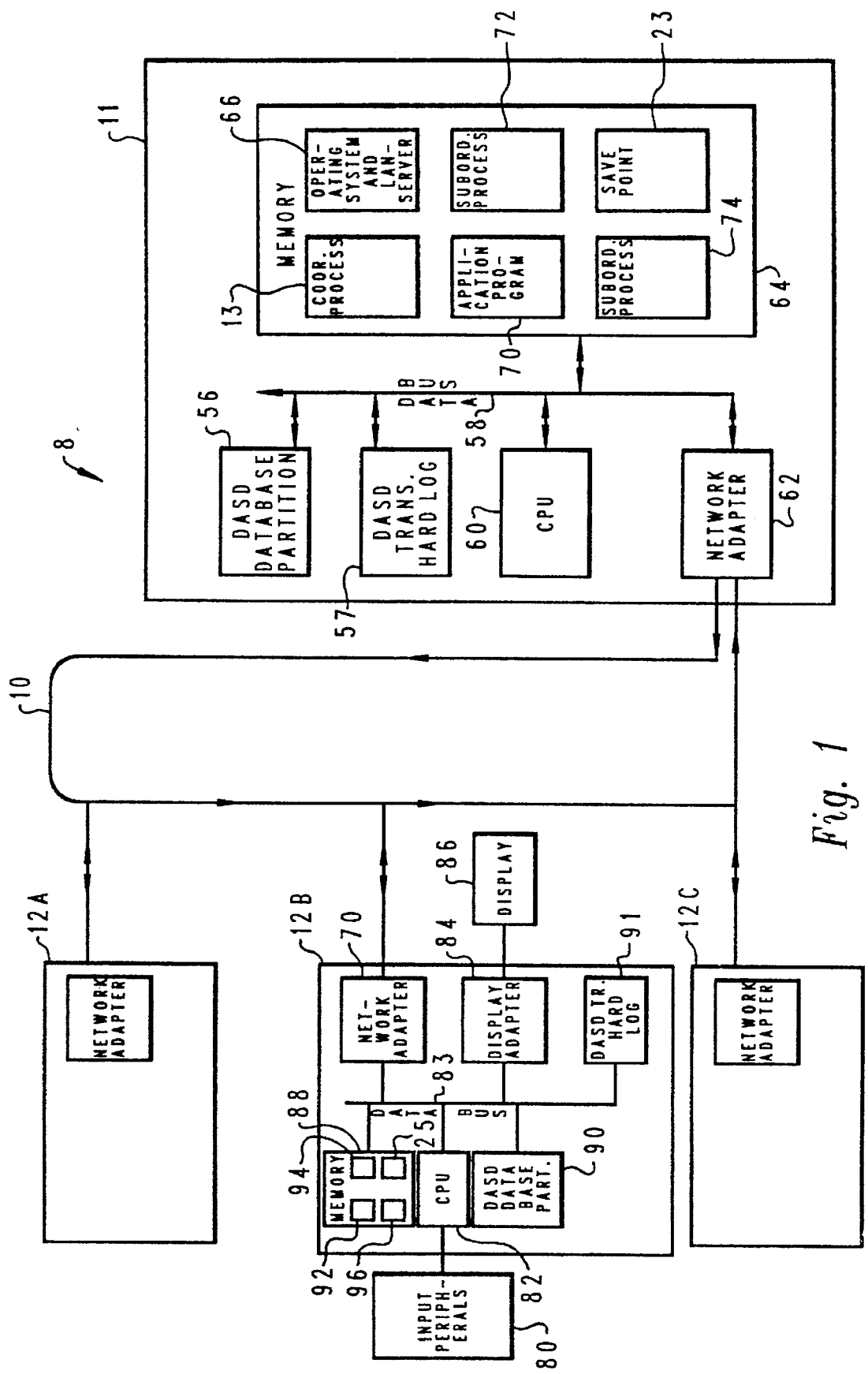
FIG. 1 is a block diagram of a local area network indicating nodes of residence of various supporting processes.

FIG. 1 is a block diagram of local area network 8 with which the invention may be practiced. Description of the invention in connection with a local area network having a token ring geometry is intended as illustrative only and not intended to imply that the invention is not applicable in different types of distributed processing environments, such as wide area networks. Computer 11 is representative of node supporting a partition of a database in a parallel database management system (PDBMS). Computer 11 is a conventional machine and includes a central processing unit 60, a random access memory (RAM) memory 64, and a direct access storage device (DASD) 56 storing a database partition and a second DASD 57 storing a transaction log of data changes made to the database partition stored in DASD 56.

Resident in memory 64 are an operating system and local area network server 66. Also resident in memory 64 and representative of the database management system is a coordination process 13 for receiving transactions from an application program 70 on computer 11 (or from application programs executing on computers 12A–12C) and distributing instances of requests contained in the transaction to the various partitions of the database. Also resident in memory 64 are subordinate processes 72 and 74 and a savepoint 23.

Computer 11 includes a network adapter 62 for formatting outgoing transmissions and for deformatting incoming transmissions over channel 10. Computer 11 communicates with computers 12A–12C, which support other partitions of the database, over a communications channel 10. Users access the shared data objects through client computers 12A–12C. Computer 12B is typical of these machines. Computer 12B is substantially similar to computer 11, and includes a DASD 90 for a database partition, a DASD 91 for a transaction log, a central processing unit (CPU) 82 and an addressable RAM memory 88. Components of computer 12B transfer data internally over a data bus 83. CPU 82 directly controls input peripherals 80 which may include a keyboard and a mouse for user interaction with the database. Display adapter 84 drives a display device 86.

In computer 12B memory 88 may include an application program 92, which may generate update requests for the database, and subordinate process 94 for handling a local instance of a distributed request received from the coordination process 13 executing on computer 11. Also present is an operating system and LAN server 96 for use in establishing a communications session on network 8 and operating computer 12B and a local savepoint 25.

A transaction can result in one or more distributed requests, each of which may span a plurality of partitions of the database. A given computer (node) may process more than one operation for one distributed request. Part of the job of the coordination process is to wait for all of the subordinate processes to report success or failure in handling the distributed requests. If any subordinate process reports failure, the coordination process signals all involved computers to rollback work done for the distributed request.

Rollback on computer 11 is done by return to a savepoint 23 maintained by the transaction log. Each computer maintains its own savepoint in memory. A savepoint at a computer consists of the request counter value (my_req_counter) and a log Sequence value (my_sp_lsn) and is used to undo changes recorded in the transaction log. Zero values for the variables indicate that no request and no savepoint have yet issued.

A savepoint 23 identifies an entry in the transaction log to which a rollback may be made. A savepoint has some similarities in this respect to a synchronization or commit point, which marks a partition between transactions. However, a savepoint 23 is distinguished from a synchronization point in that each savepoint is local. Establishing a savepoint 23 is not the same as performing a commit since updates made by the transaction are not yet visible to other transactions and will not become so until the transaction for which the savepoint is established reaches a successful end of transaction.

Upon initialization of a transaction the coordination process and all subordinate processes receive their own copies of variables designated my_req_counter (request counter) and my_sp_lsn (log sequence number) for a savepoint. These variables are maintained in local RAM memory for the computer involved and persist between distributed requests. The request counter is maintained at the coordinator to distinguish operations that have taken place at any given node for different database request. The counter is initialized to zero when a database connection is made (i.e. a transaction is initiated) and incremented with each receipt of a database request (e.g., update a set of records in a relation). The request counter for coordination process 13 is an included parameter in each distributed request instance.

Figure 2:
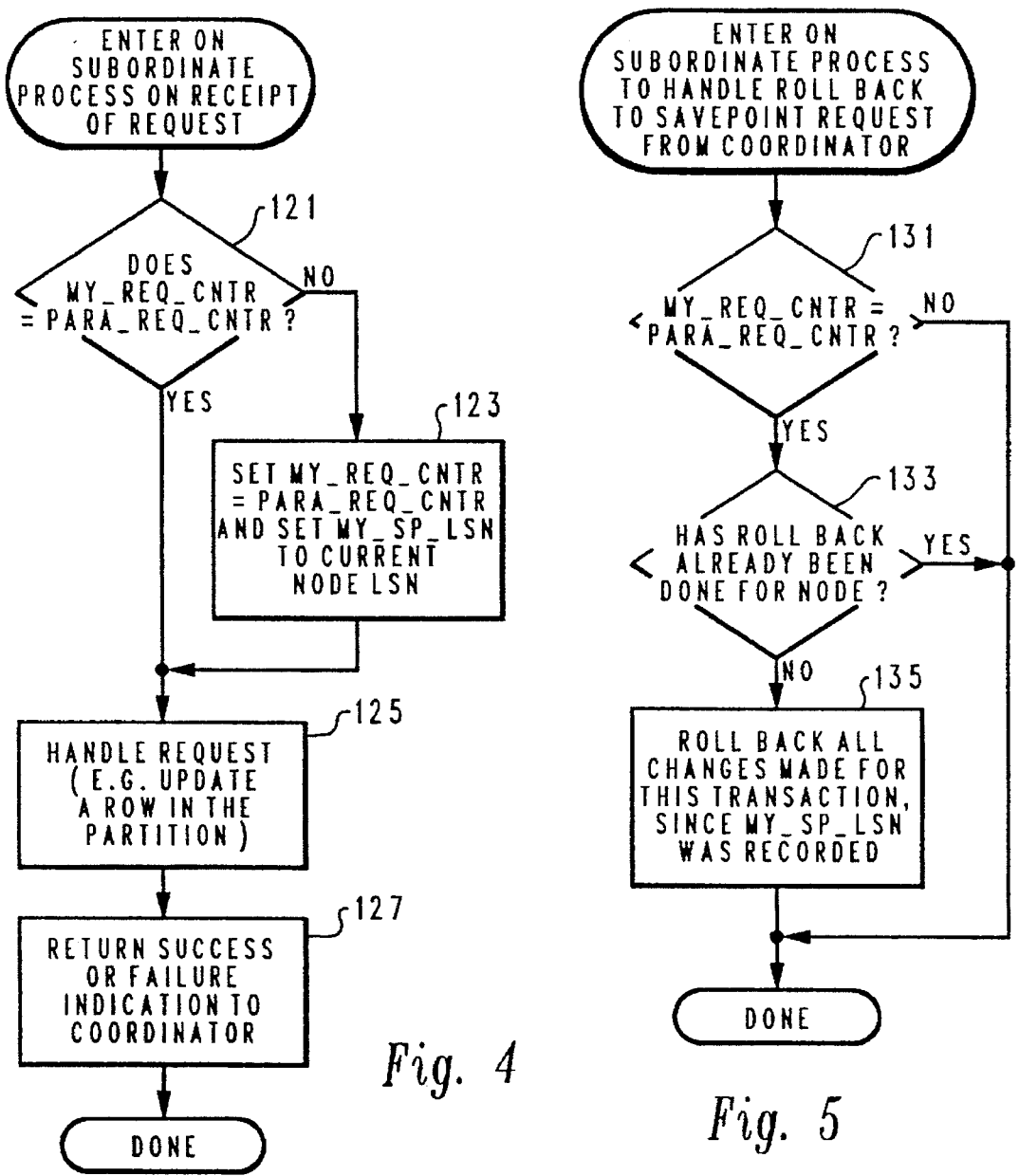
FIG. 2 is a high level logical flow chart of a transaction initialization process.

FIG. 2 is a high level flow chart illustrating response of coordination process 13 and the subordinate processes 72, 74 and 94 in the database upon initialization of a transaction. For each process the response consists of step 101, which provides for setting my_req_counter and my_sp_lsn equal to zero initializing the local savepoint.

Figure 3:
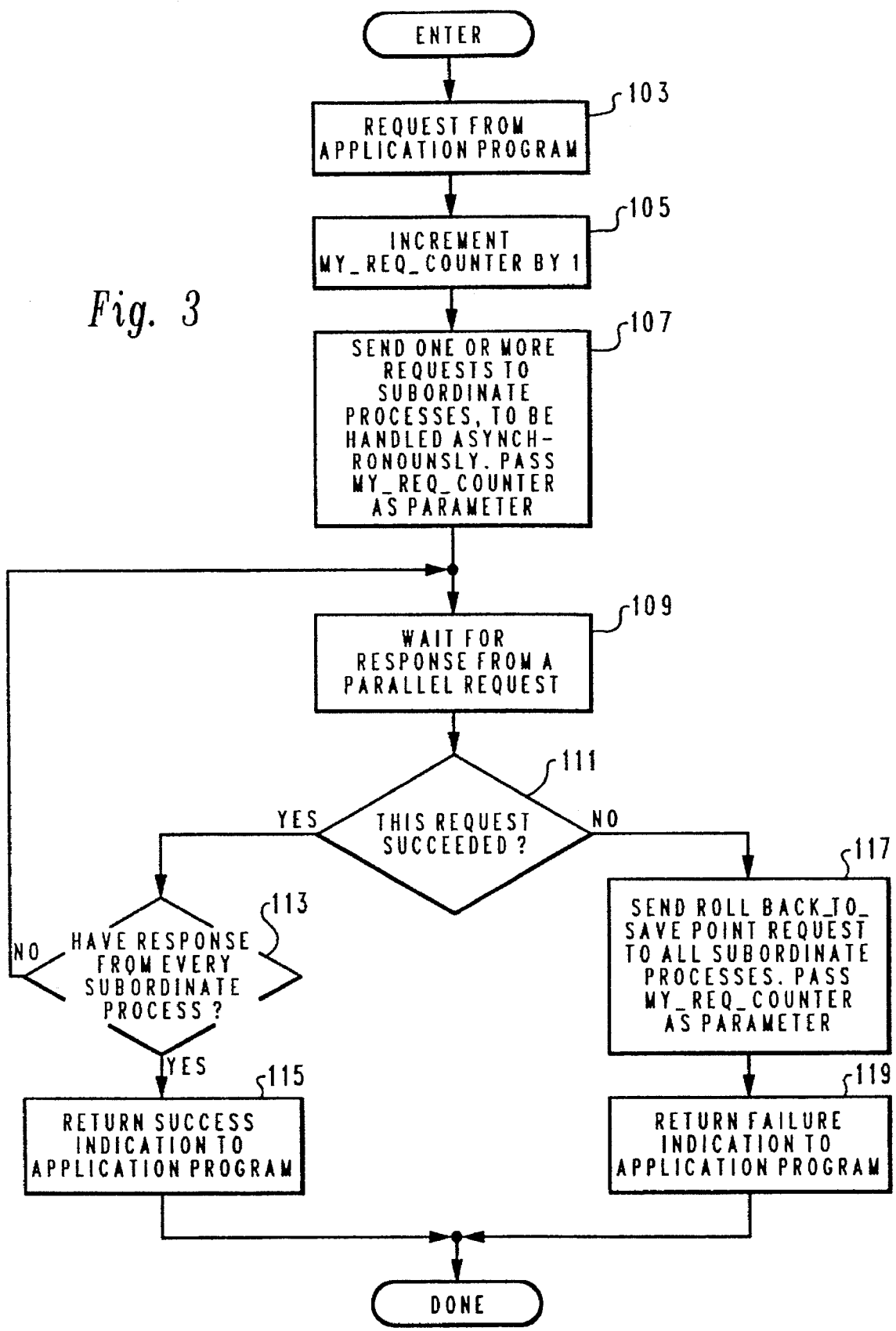
FIG. 3 is a high level logical flow chart of a process for a coordinator process in a distributed database manager system.

FIG. 3 illustrates how the coordination process handles receipt of a request for distribution from an application program (step 103). At step 105 the local value of my_req_ counter is incremented by one. Next, at step 107 one or more request instances are sent to subordinate processes. The variable my_req_counter is passed to the subordinate processes as a parameter of the request instance. Next, step 109 represents waiting for results to be posted by the subordinate processes and collected by the coordination process. If any request instance fails for any request, it is detected at step 111. The NO branch is taken from step 111 to step 117 where the coordination process notifies all subordinate processes involved in processing the distributed request to rollback to their savepoints. Again (my_req_counter) is passed as a parameter of the request. The coordination process also informs the appropriate application program of the failure (step 119). The YES branch from step 111 advances processing to step 113, which is provided to collect indication of success from all involved subordinate processes. Until all subordinate processes have indicated success, processing is returned along the NO branch to step 109. After all processes have returned a success indication, step 115 is executed to notify the application program of success. The system wide distributed request is now considered a success and no further action is taken for the request until the transaction as a whole is committed. Following either step 115 or 119 the process is done.

FIG. 4 is a high level logical flow chart illustrating handling of a distributed request instance by a representative subordinate process. Before a distributed request instance is processed, a new savepoint may be made, replacing a prior savepoint for another distributed request instance. The process is entered at step 121 with a determination if the local version of my_req_counter is equal in value to parameter_ req_counter, the coordination process version of my_req_ counter which is passed with the distributed request instance. If the parameter passed by a distributed request instance is the same as that in the node's current savepoint, it means that the node has already started processing on behalf of the distributed request. The YES branch is taken from step 121 to leave the savepoint unchanged. If the two versions of the parameter disagree in value, the local version my_req_counter is set equal to the version passed with the request instance by execution of step 123 and my_req_lsn is set equal to the current node log sequence number. Once the savepoint is verified (the YES branch from step 121 or after step 123), the distributed request instance may be processed (e.g., update of a record in a relation of the partition). The update may succeed or fail. At step 127 success or failure is indicated to the coordination process. After completing a distributed request instance, the savepoint persists in memory. The savepoint remains available until notification from the coordination process of the need to rollback to the savepoint, a new distributed request instance is received at the node, or the transaction is committed.

FIG. 5 is a high level logical flow chart of a rollback process executed by a subordinate process upon receipt of a rollback request from a coordination process. At each subordinate process, the request counter value passed with the rollback request is compared with the value of the local request counter. If the values disagree, the current savepoint for the subordinate process is for a different distributed request. No database changes have been made at the relating to the distributed request and, therefore, nothing needs to be rolled back. The rollback request is ignored. In the flow chart this operation is represented by step 131, which compares the local version of my_req_counter with the version passed as a parameter of the rollback request. Upon disagreement of the values the process is presently exited. If the two versions of the request counter are in agreement, step 133 is executed to determine if the rollback has already been done. If yes, the process is exited along the YES branch from step 133. If the rollback has not already been done, step 135 is executed to rollback all changes for the current transaction (recovered from the transaction log) since my_sp_lsn was last recorded. The process is then complete.

The invention provides for improvement in parallel handling of distributed requests. When a distributed request is successful on all nodes there is now no need for distribution of messages from the coordination process to remove savepoints. Further only one savepoint per node is required, which simplifies the rollback operation.

While the invention has been particularly shown and described with reference to a preferred embodiment, it will be understood by those skilled in the art that various changes in form and detail may be made therein without departing from the spirit and scope of the invention.

What is claimed is:

1. A method of managing distributed requests on a parallel database management system wherein each distributed request comprises a plurality of request instances which may span a plurality of subordinate processes, comprising:

distributing a plurality of request instances for a selected request to a plurality of subordinate processes, each request instance including associated request savepoint data;

responsive to receipt of a request instance on a selected subordinate process, updating a local savepoint with the associated request savepoint data and locally generated savepoint data;

executing the request instance for each selected subordinate process;

indicating to a coordination process success or failure of execution on each request instance; and responsive to indication of failure of execution for any request instance of the selected request, performing a rollback on each subordinate process which the local savepoint indicates executed a request instance for the selected request.

2. A method of managing distributed requests on a parallel database management system as set forth in claim 1, and further comprising:

responsive to initiation of a transaction, initializing a request counter for the coordination process;

responsive to receipt of a request from an application program by the coordination process, incrementing the request counter for the coordination process; and the step of distributing including passing the request counter as request savepoint data.

3. A method of managing distributed requests on a parallel database management system as set forth in claim 2, wherein locally generated savepoint data includes a log sequence number tracking instances of changes to a partition.

4. A method of managing distributed requests on a parallel database management system as set forth in claim 3, and further comprising:

responsive to initiation of a transaction, initializing the local savepoint for all of a plurality of distributed processes by setting the local request counter and the log sequence number to value indicating no prior issuance of request savepoint data.

5. A method of managing distributed requests on a parallel database management system as set forth in claim 4, wherein updating of a local savepoint further includes adding a current value for the log sequence number to the savepoint.

6. A method of managing distributed requests on a parallel database management system as set forth in claim 5, and further comprising:

responsive to issuance of a request instance to a selected subordinate process, discarding any prior savepoint for the selected subordinate processes;

responsive to rolling back to a savepoint on a subordinate process, discarding the savepoint; and responsive to conclusion of the transaction, discarding savepoints across all subordinate processes.

7. A parallel database management system for managing distributed requests which each comprise a plurality of request instances which may span a plurality of subordinate processes, comprising:

a network having a plurality of computers;

a database distributed among partitions on the plurality of computers;

a plurality of subordinate processes resident on the plurality of computers for generating local savepoints for the partitions, for executing a request instance and for signalling over the network failure or success of execution;

a coordinator resident on a computer for receiving requests from applications wherein each request comprises a plurality of request instances, for distributing request instances and request savepoint data relating to the request to selected subordinate processes and for issuing a rollback request with a reference for comparison to the local savepoints upon receipt of a signal indicating failure of execution by a subordinate process;

memory for each of the plurality of computers for storing the local savepoints between the requests; and the subordinate processes being responsive to the reference of the matching the local savepoints for executing a rollback.

8. A parallel database management system for managing distributed requests as set forth in claim 7, and further comprising:

a log sequence number generator for each computer for tracking all changes to the partition during a transaction; and means with each computer responsive to receipt of a request instance for placing a log sequence number into the local savepoint.

9. A parallel database management system for managing distributed requests as set forth in claim 8, wherein the request savepoint data includes a value for the request count for the coordinator.

10. A parallel database management system for managing distributed requests as set forth in claim 9, the coordinator further including a process responsive to entry to a transaction for initiating a request counter for the coordinator.

11. A parallel database management system for managing distributed requests as set forth in claim 10, the subordinate processes further including a process responsive to entry to a transaction for initiating a request counter for each subordinate process and for initiating the log sequence count.

12. A data processing program product for assuring atomicity of distributed update requests on a parallel database management system wherein each distributed update request comprises a plurality of request instances which may span a plurality of subordinate processes, said data processing program product comprising media storing:

instruction means for distributing a plurality of request instances for a selected request to a plurality of subordinate processes, each request instance including associated request savepoint data;

instruction means responsive to receipt of a request instance on a selected subordinate process for updating a local savepoint with the request savepoint data associated and locally generated savepoint data;

instruction means for executing the request instance for each selected subordinate process;

instruction means for indicating to a coordination process success or failure of execution on each request instance; and instruction means responsive to indication of failure of execution for any request instance of the selected request for performing a rollback on each subordinate process which the local savepoint indicates executed a request instance for the selected request.

13. A data processing program product as set forth in claim 12, the media further comprising:

instruction means responsive to initiation of a transaction for initializing a request counter for the coordination process;

instruction means responsive to receipt of a request from an application program by the coordination process for incrementing the request counter for the coordination process; and the instruction means for distributing including instruction means for passing the request counter as request savepoint data.

14. A data processing program product as set forth in claim 13, wherein locally generated savepoint data includes a log sequence number tracking instances of changes to a partition.

15. A data processing program product as set forth in claim 14, the media further comprising:

instruction means responsive to initiation of a transaction for initializing the local savepoint for all of a plurality of distributed processes by setting the local request counter and the log sequence number to value indicating no prior issuance of request savepoint data.

16. A data processing program product as set forth in claim 15, wherein the instruction means for updating of a local savepoint further includes instruction means for adding a current value for the log sequence number to the savepoint.

17. A data processing program product as set forth in claim 16, the media further comprising:

instruction means responsive to issuance of a request instance to a selected subordinate process for discarding any prior savepoint for the selected subordinate processes;

instruction means responsive to rolling back to a savepoint on a subordinate process for discarding the savepoint; and instruction means responsive to conclusion of the transaction for discarding savepoints across all subordinate processes.

* * * * *